US012098838B1

(12) United States Patent
Heimerdinger et al.

(10) Patent No.: US 12,098,838 B1
(45) Date of Patent: Sep. 24, 2024

(54) LIGHTING ASSEMBLY FOR OVER THE RANGE MICROWAVE OVEN

(71) Applicant: Haier US Appliance Solutions, Inc., Wilmington, DE (US)

(72) Inventors: Mark Heimerdinger, Louisville, KY (US); Bagawathkumar Chellappan, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/463,953

(22) Filed: Sep. 8, 2023

(51) Int. Cl.

| | |
|---|---|
| ***F21V 33/00*** | (2006.01) |
| ***F21V 3/02*** | (2006.01) |
| ***F21V 3/04*** | (2018.01) |
| ***F21V 23/00*** | (2015.01) |
| ***F21W 131/307*** | (2006.01) |
| ***F21Y 103/10*** | (2016.01) |
| ***F21Y 115/10*** | (2016.01) |

(52) U.S. Cl.
CPC ............ *F21V 33/0044* (2013.01); *F21V 3/02* (2013.01); *F21V 3/049* (2013.01); *F21V 23/005* (2013.01); *F21W 2131/307* (2013.01); *F21Y 2103/10* (2016.08); *F21Y 2115/10* (2016.08)

(58) Field of Classification Search
CPC ........ F21V 33/0044; F21V 3/02; F21V 3/049; F21V 23/005; F21W 2131/307; F21Y 2103/10; F21Y 2115/10; F24C 7/02; F24C 7/08; H05B 6/6426
See application file for complete search history.

(56) References Cited

U.S. PATENT DOCUMENTS

| | | | | |
|---|---|---|---|---|
| 7,091,459 | B2 * | 8/2006 | Kim | H05B 6/6402 126/237 |
| 9,702,619 | B2 | 7/2017 | Kendall et al. | |
| 2009/0080178 | A1 | 3/2009 | Wilsdorf | |
| 2013/0277353 | A1 | 10/2013 | Joseph et al. | |
| 2016/0186984 | A1 * | 6/2016 | Giacomini | F24C 15/024 362/85 |

FOREIGN PATENT DOCUMENTS

| | | | |
|---|---|---|---|
| CN | 103383115 A | | 11/2013 |
| CN | 111023178 | * | 4/2020 |
| WO | WO9701065 | * | 1/1997 |

OTHER PUBLICATIONS

CN 111023178, Hui Huang, Apr. 17, 2020 English Translation (Year: 2020).*
WO 9701065, Shigeki Ueda, Jan. 9, 1997, English Translation (Year: 1997).*

* cited by examiner

*Primary Examiner* — Peggy A Neils
(74) *Attorney, Agent, or Firm* — Dority & Manning, P.A.

(57) ABSTRACT

A microwave appliance is provided, including a cabinet including a plurality of walls forming a cooking chamber, wherein a plurality of cabinet openings is formed at a front wall. A door is positioned adjacent to the front wall when in a closed position. A lighting system is positioned at one or more of the plurality of cabinet openings. The lighting system includes a circuit board at which a light-emitting diode (LED) is operably coupled. The lighting system includes a diffuser coupled to the circuit board and positioned around the LED. The LED is positioned in adjacent arrangement along the circuit board. The circuit board is positioned on a mount structure configured to attach to the front wall of the cabinet.

17 Claims, 9 Drawing Sheets

LIGHTING ASSEMBLY FOR OVER THE RANGE MICROWAVE OVEN

FIELD OF THE INVENTION

The present disclosure relates generally to over the range kitchen appliances. In particular, the disclosure relates to over the range microwave appliances and lighting systems therefor.

BACKGROUND OF THE INVENTION

Built-in kitchen appliances, for example microwave ovens, have become commonplace in household kitchens. In many applications, a microwave is built-in over a cooktop or range. Microwaves configured in this arrangement are generally referred to as over-the-range (OTR) appliances. In many cases, OTR microwave ovens include a ventilation system to capture and redirect steam, smoke, airborne grease, or odors generated at the range.

OTR appliances are limited in the positioning of ancillary systems, such as lighting systems. For instance, lighting systems are challenged to avoid ventilation systems, such as to avoid obstruction of ventilation openings. Kitchen cabinets further limit positioning of a lighting system.

Accordingly, an OTR microwave and system addressing one or more of these issues would be beneficial and advantageous.

BRIEF DESCRIPTION OF THE INVENTION

Aspects and advantages of the invention will be set forth in part in the following description, may be apparent from the description, or may be learned through practice of the invention.

An aspect of the present disclosure is directed to an over the range microwave appliance defining a vertical direction, a lateral direction, and a transverse direction. The over the range microwave appliance includes a cabinet having a plurality of walls forming a cooking chamber. A plurality of cabinet openings is formed at a front wall. A door is positioned adjacent to the front wall when in a closed position. A lighting system is positioned at one or more of the plurality of cabinet openings. The lighting system includes a circuit board at which a light-emitting diode (LED) is operably coupled. The lighting system includes a diffuser coupled to the circuit board and positioned around the LED. The LED is positioned in adjacent arrangement along the circuit board. The circuit board is positioned on a mount structure configured to attach to the front wall of the cabinet.

Another aspect of the present disclosure is directed to a microwave appliance defining a vertical direction, a lateral direction, and a transverse direction. The microwave appliance includes a cabinet having a plurality of walls forming a cooking chamber. A plurality of cabinet openings is formed at a front wall. A door is positioned adjacent to the front wall when in a closed position. A lighting system is positioned at one or more of the plurality of cabinet openings. The lighting system includes a circuit board at which a light-emitting diode (LED) is operably coupled. The lighting system includes a diffuser coupled to the circuit board and positioned around the LED. The LED is positioned in adjacent arrangement along the circuit board along the lateral direction. The circuit board is positioned on a mount structure configured to attach to the front wall of the cabinet. The circuit board and the mount structure are extended along the lateral direction. A deflector forms openings corresponding, at least in part, to the plurality of cabinet openings. The lighting system is positioned between the deflector and the front wall of the cabinet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
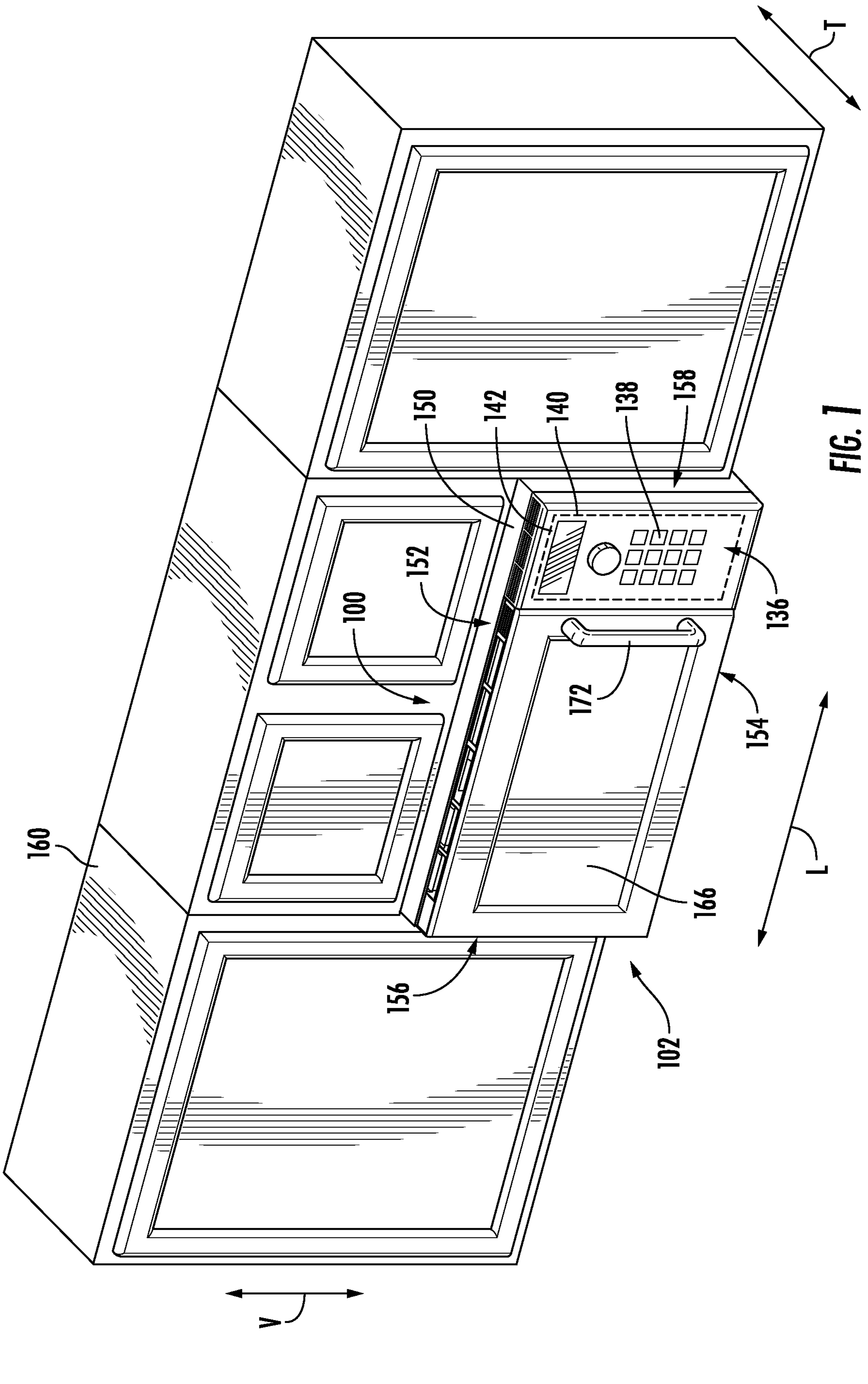
FIG. 1 provides a perspective view of a system, including an over the range microwave appliance, in accordance with an embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Embodiments of the present disclosure are referenced throughout this document with regard to an over the range (OTR) microwave with a ventilation system. The reference to a microwave is for illustration, not limitation.

Turning to the figures, FIG. 1 provides a perspective view of a system 100 according to exemplary embodiments of the present disclosure. System 100 generally includes an over-the-range (OTR) microwave appliance 102 that can be positioned or mounted above a cooktop appliance or range. The microwave appliance 102 includes a lighting system 210, such as further described herein. is It should be appreciated that the present subject matter is not limited to the specific appliances disclosed, and the specific appliance configurations are not intended to limit the scope of the present subject matter in any manner. Reference to a microwave throughout this disclosure is for purposes of illustration and not to limit the scope of the disclosure.

As shown in FIG. 1, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and range 104 and will thus be used interchangeably to describe both appliances and their positions relative to each other.

Figure 2:
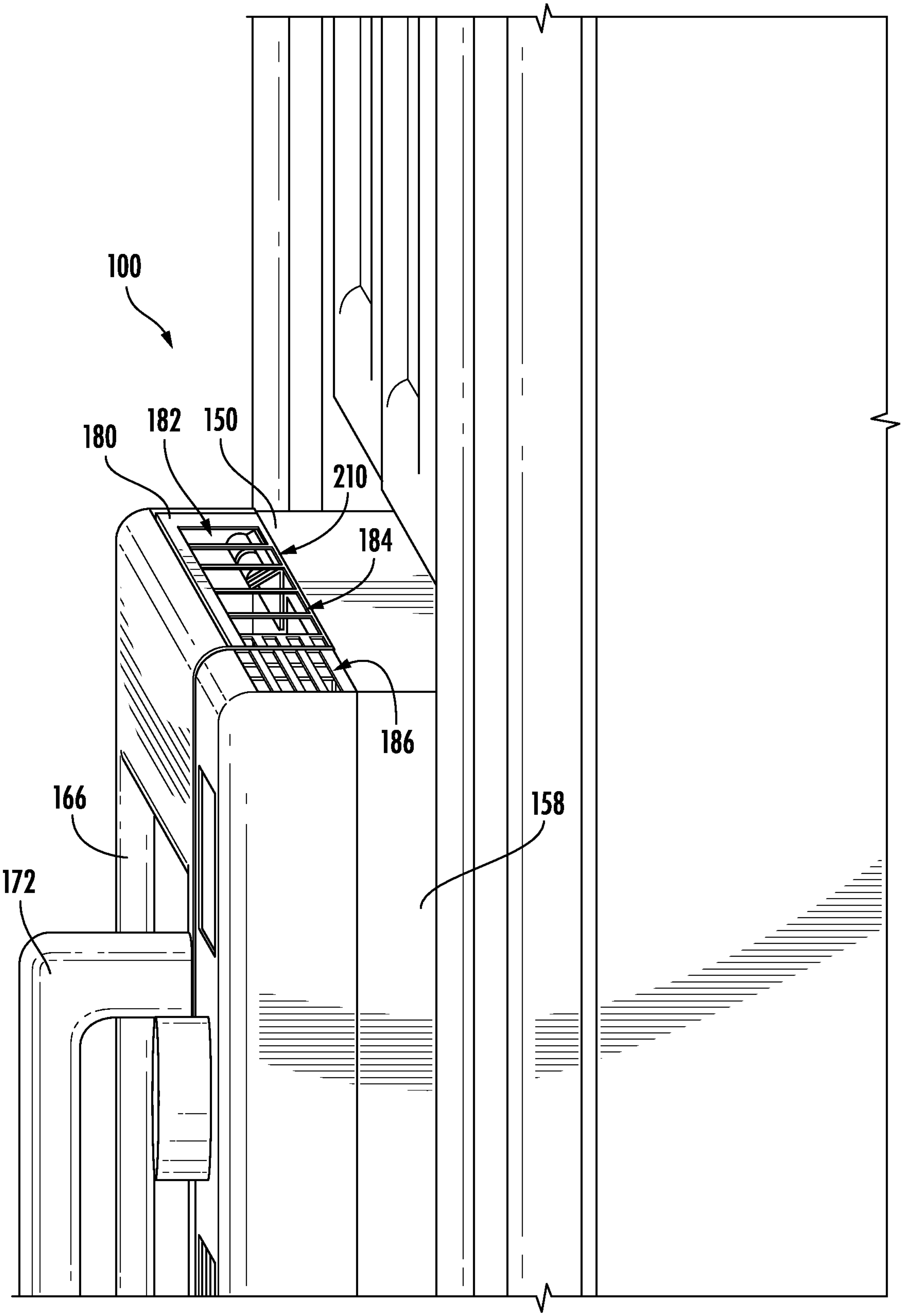
FIG. 2 provides a perspective view of the system in accordance with an embodiment of the present disclosure.
Figure 3:
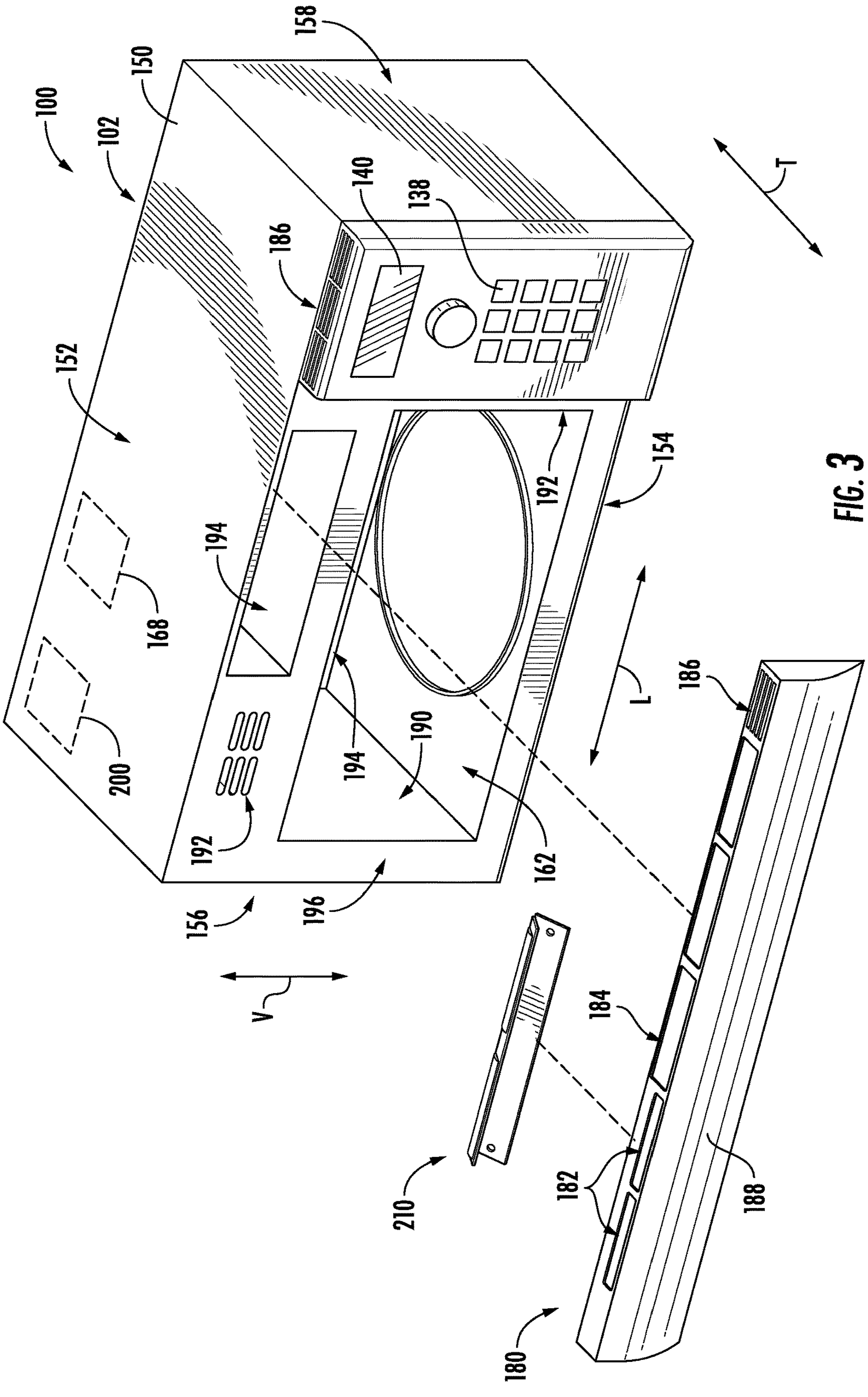
FIG. 3 provides an exploded view of components of the system in accordance with an embodiment of the present disclosure.
Figure 4:
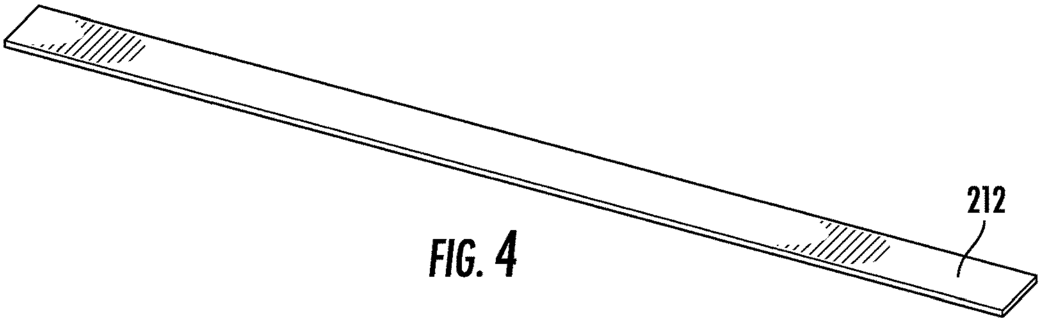
FIG. 4 provides a perspective view of a portion of an embodiment of a lighting system in accordance with an embodiment of the present disclosure.
Figure 5:
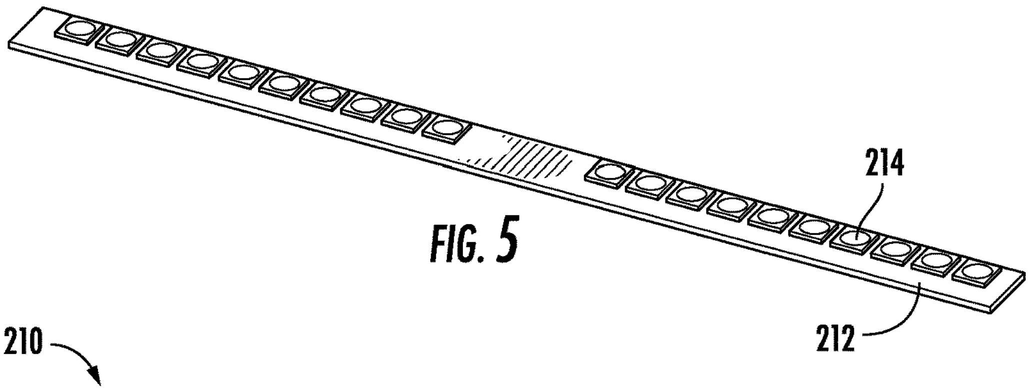
FIG. 5 provides a perspective view of a portion of an embodiment of the lighting system in accordance with an embodiment of the present disclosure.
Figure 6:
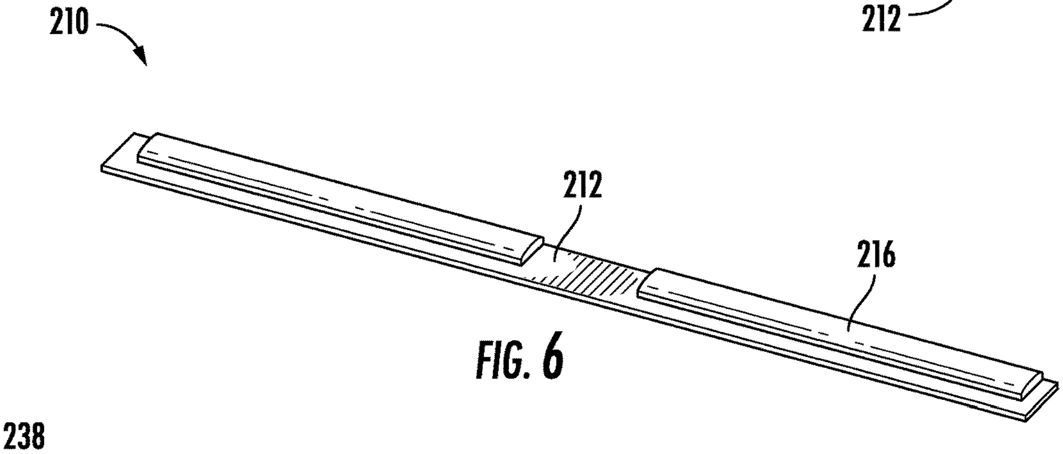
FIG. 6 provides a perspective view of an embodiment of the lighting system in accordance with an embodiment of the present disclosure.

Referring still to FIG. 1, and furthermore to the perspective view in FIG. 2 and the exploded view in FIG. 3, OTR microwave appliance 102 may include a control panel 136 that may represent a general-purpose Input/Output ("GPIO") device or functional block for microwave appliance 102. In some embodiments, control panel 136 may include or be in operative communication with one or more user input devices 138, such as one or more of a variety of digital, analog, electrical, mechanical, or electro-mechanical input devices including rotary dials, control knobs, push buttons, toggle switches, selector switches, and touch pads. Additionally, microwave appliance 102 may include a display 140, such as a digital or analog display device generally configured to provide visual feedback regarding the operation of microwave appliance 102. For example, display 140 may be provided on control panel 136 and may include one or more status lights, screens, or visible indicators. According to exemplary embodiments, user input devices 138 and display 140 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Microwave appliance 102 may further include or be in operative communication with a processing device or a controller 142 that may be generally configured to facilitate appliance operation. In this regard, control panel 136, user input devices 138, and display 140 may be in communication with controller 142 such that controller 142 may receive control inputs from user input devices 138, may display information using display 140, and may otherwise regulate operation of microwave appliance 102. For example, signals generated by controller 142 may operate microwave appliance 102, including any or all system components, subsystems, or interconnected devices, in response to the position of user input devices 138 and other control commands. Control panel 136 and other components of microwave appliance 102 may be in communication with controller 142 via, for example, one or more signal lines or shared communication busses. In this manner, Input/Output ("I/O") signals may be routed between controller 142 and various operational components of microwave appliance 102.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 142 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 142 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 142 may be operable to execute programming instructions or micro-control code associated with an operating cycle of appliance 102. In this regard, the instructions may be software or any set of instructions that when executed by the processing device, cause the processing device to perform operations, such as running one or more software applications, displaying a user interface, receiving user input, processing user input, etc. Moreover, it should be noted that controller 142 as disclosed herein is capable of and may be operable to perform any methods, method steps, or portions of methods as disclosed herein. For example, in some embodiments, methods disclosed herein may be embodied in programming instructions stored in the memory and executed by controller 142.

The memory devices may also store data that can be retrieved, manipulated, created, or stored by the one or more processors or portions of controller 142. The data can include, for instance, data to facilitate performance of methods described herein. The data can be stored locally (e.g., on controller 142) in one or more databases and/or may be split up so that the data is stored in multiple locations. In addition, or alternatively, the one or more database(s) can be connected to controller 142 through any suitable network(s), such as through a high bandwidth local area network (LAN) or wide area network (WAN). In this regard, for example, controller 142 may further include a communication module or interface that may be used to communicate with one or more other component(s) of microwave appliance 102, controller 142, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

As noted above, microwave appliance 102 may be positioned or mounted above range 104 (e.g., as an OTR microwave). Specifically, a cabinet 150 of OTR microwave appliance 102 may be positioned above range 104 along the vertical direction V.

In embodiments, the cabinet 150 may be an insulated cabinet. As shown, cabinet 150 of microwave appliance 102 includes a plurality of walls and when assembled, microwave appliance 102 generally extends along the vertical direction V between a top end 152 and a bottom end 154; along the lateral direction L between a first side end 156 and a second side end 158; and along the transverse direction T between a front end and a rear end.

A cooking chamber 162 is formed within cabinet 150. The cooking chamber 162 is formed between a first side wall 190 laterally spaced from a second side wall 192, and a rear wall 194 transversely spaced from a door 166. Microwave appliance 102 is generally configured to heat articles (e.g., food or beverages) within the cooking chamber 162 using electromagnetic radiation. Microwave appliance 102 may include various components which operate to produce the electromagnetic radiation, as is generally understood. For example, microwave appliance 102 may include a heating assembly 168 in a mechanical space 200, the heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 162.

The structure and intended function of microwave oven are generally understood by those of ordinary skill in the art and are not described in further detail herein. Embodiments of the microwave appliance 102 provided herein may generally be positioned at, within, or mounted to a cabinet 160, such as a kitchen cupboard or other furnishing.

The door 166 is movably mounted (e.g., rotatably attached) to cabinet 150 in order to permit selective access to cooking chamber 162. Specifically, door 166 can move between an open position (not pictured) and a closed position (e.g., FIG. 1). The open position permits access to cooking chamber 162 while the closed position restricts access to cooking chamber 162. The handle 172 may be mounted to or formed on door 166 to assist a user with opening and closing door 166. When in a closed position, the door 166 abuts or is adjacent to a front wall 196 of the cabinet 150.

Referring generally to FIGS. 3-16, embodiments of the lighting system 210 are provided. FIGS. 4-7 depict at least a portion of the lighting system 210. In various embodiments, lighting system 210 includes a circuit board 212 (e.g., a printed circuit board, or PCB) at which a light-emitting diode (LED) 214 is operably coupled. A diffuser 216 is coupled to the board 212 and positioned around the LED 214. The LED 214 may be positioned in adjacent arrangement, such as aligned along the board 212. In various embodiments, the board 212 including the LED 214 and diffuser 216 is positioned on a mount structure 218. Embodiments of the diffuser 216 may include any desired surfaces, such as coatings, designs, embosses, tints, or other aesthetics, such as may enhance an output of the LED 214.

Figure 9:
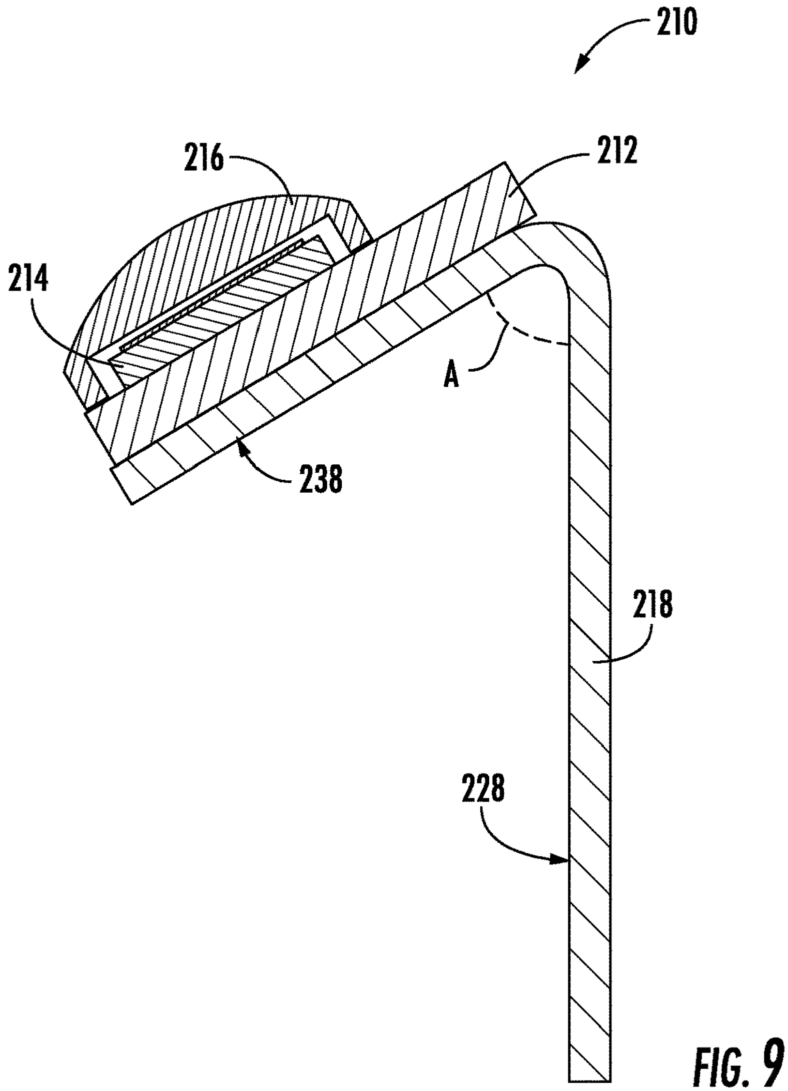
FIG. 9 provides a side view of an embodiment of the lighting system in accordance with an embodiment of the present disclosure.

Referring to FIG. 9, a side view of an exemplary embodiment of the lighting system 210 is provided. In various embodiments, the mount structure 218 includes a first member 228 coupled to a second member 238. The first member 228 and the second member 238 are connected at an end and spaced along an angle A. For instance, angle A is between 0 degrees and 90 degrees, such as, but not limited to, between 15 degrees and 80 degrees, or between 30 degrees and 60 degrees. The board 212 is attachable to the second member 238, such as to project light from the LED 214 and diffuser 216 at an angle based at least on angle A. In various embodiments, angle A may be desirably adjusted, such as to move or articulate an angular position of the LED 214 and diffuser 216, or a projection (e.g., projected image) therefrom.

Figure 7:
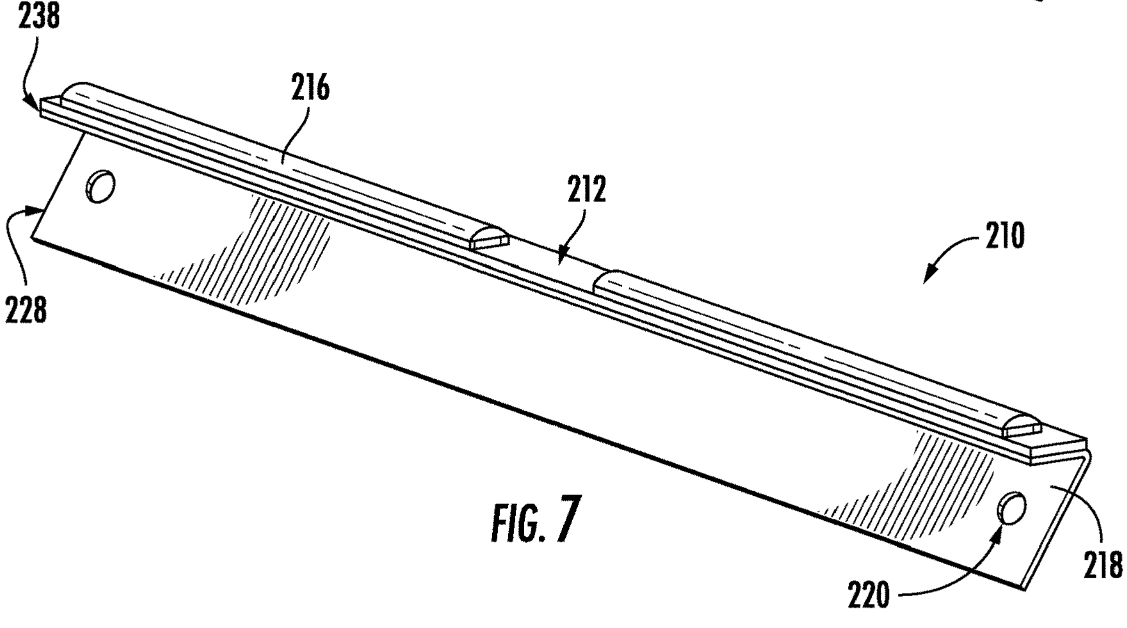
FIG. 7 provides a perspective view of an embodiment of the lighting system in accordance with an embodiment of the present disclosure.
Figure 8:
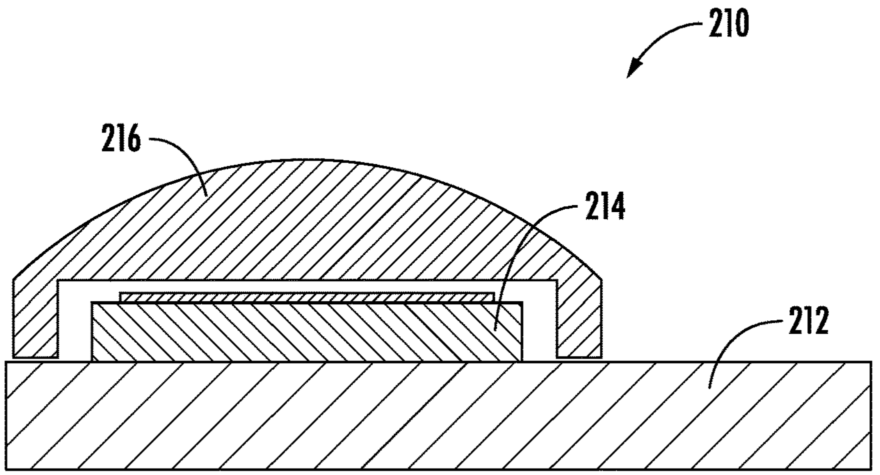
FIG. 8 provides a side view of an embodiment of the lighting system in accordance with an embodiment of the present disclosure.

The mount structure 218 is attachable to the housing 150 of the microwave appliance 102. For instance, the first member 228 is attachable to the front wall 196 above the cooking chamber 162. In some embodiments, such as depicted in FIG. 7, the first member 228 may include an opening 220 allowing a fastener to extend therethrough. For instance, the fastener may extend through the opening 220 and into the cabinet 150, such as into front wall 196, to couple the lighting system 210 to the cabinet 150. Wiring, power supply, control lines, or communications buses 222 may extend from the lighting system 210 and operably couple to the controller 142.

It should be appreciated that, in various embodiments, the mount structure 218 is attachable to the cabinet 150 using an adhesive substance, such as, but not limited to, an epoxy, glue, bonding agent, or other appropriate bonding mechanism.

Figure 10:
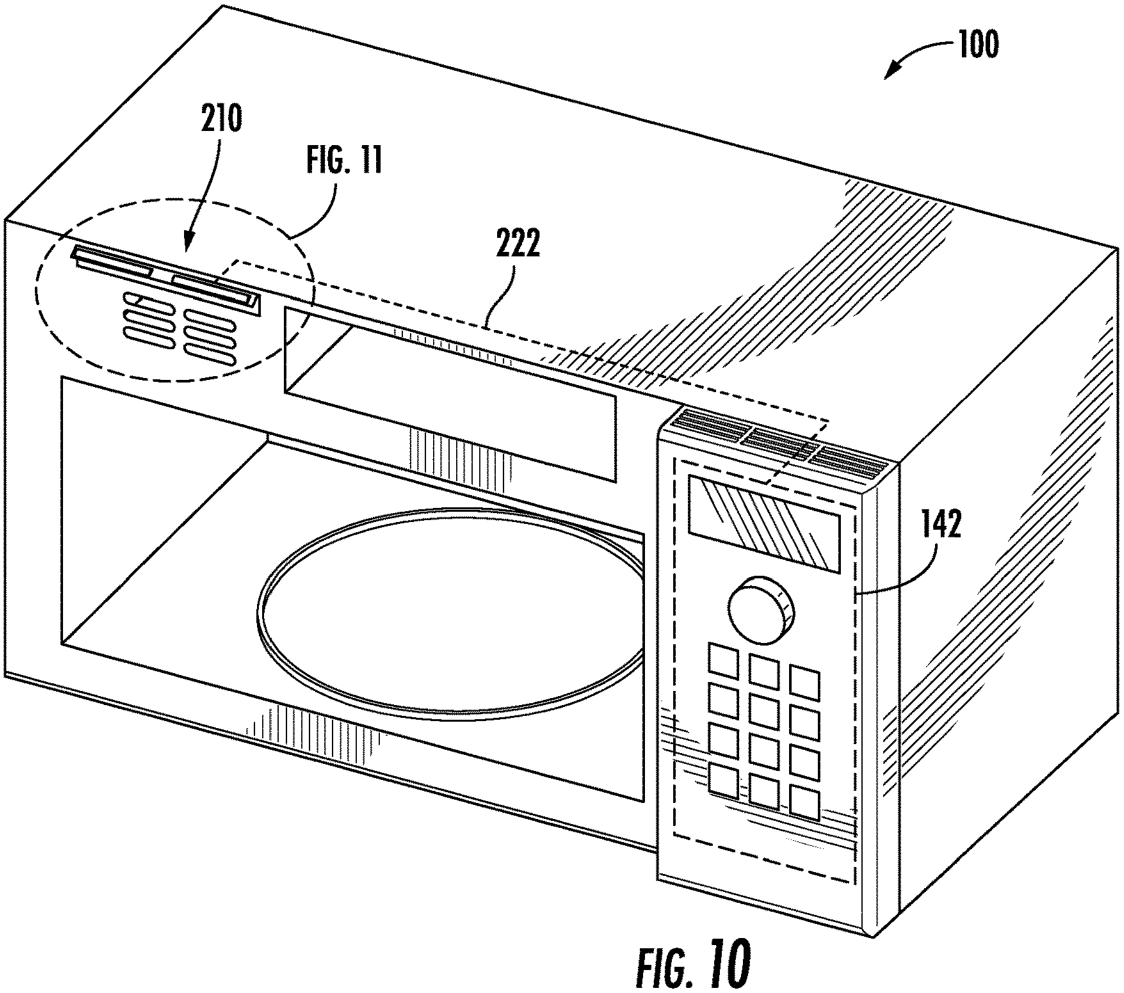
FIG. 10 provides a perspective view of the system in accordance with an embodiment of the present disclosure.

Referring back to FIG. 3, and further depicted in FIG. 10, the cabinet 150 may form a plurality of openings. A first cabinet opening 192 may correspond to a humidity sensor air outlet. A second cabinet opening 194 may correspond to a vent hood recirculation air outlet. A third opening 186 may correspond to a magnetron cooling air inlet. A deflector 180 may form openings corresponding, at least in part, to the plurality of openings at the cabinet 150, or at least a portion thereof. For instance, the deflector 180 may include a first deflector opening 182 corresponding to the first cabinet opening 192. The deflector 180 may include a second deflector opening 184 corresponding to the second cabinet opening 194. The deflector 180 may include the third opening 186, such as corresponding to the magnetron cooling air inlet. However, as depicted in FIG. 3, the third opening 186 may be formed at the cabinet 150 or control panel housing at which user input devices 138 are positioned.

Figure 11:
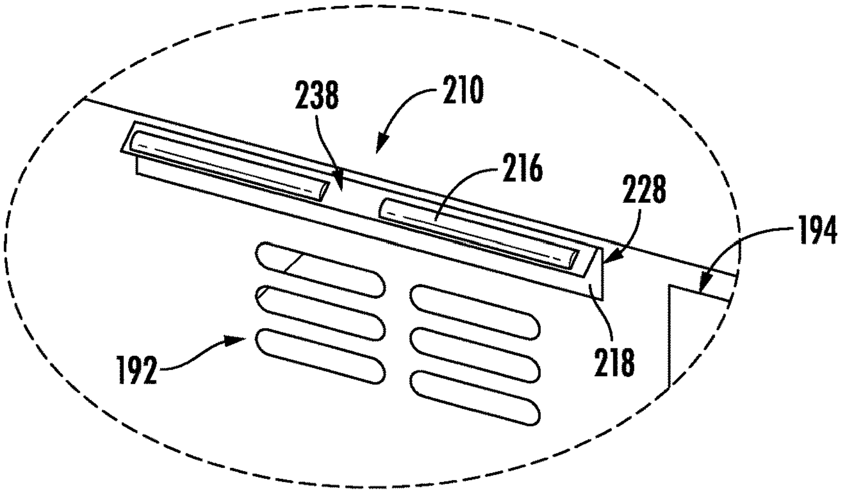
FIG. 11 provides a detailed perspective view of the system of FIG. 10 in accordance with an embodiment of the present disclosure.
Figure 12:
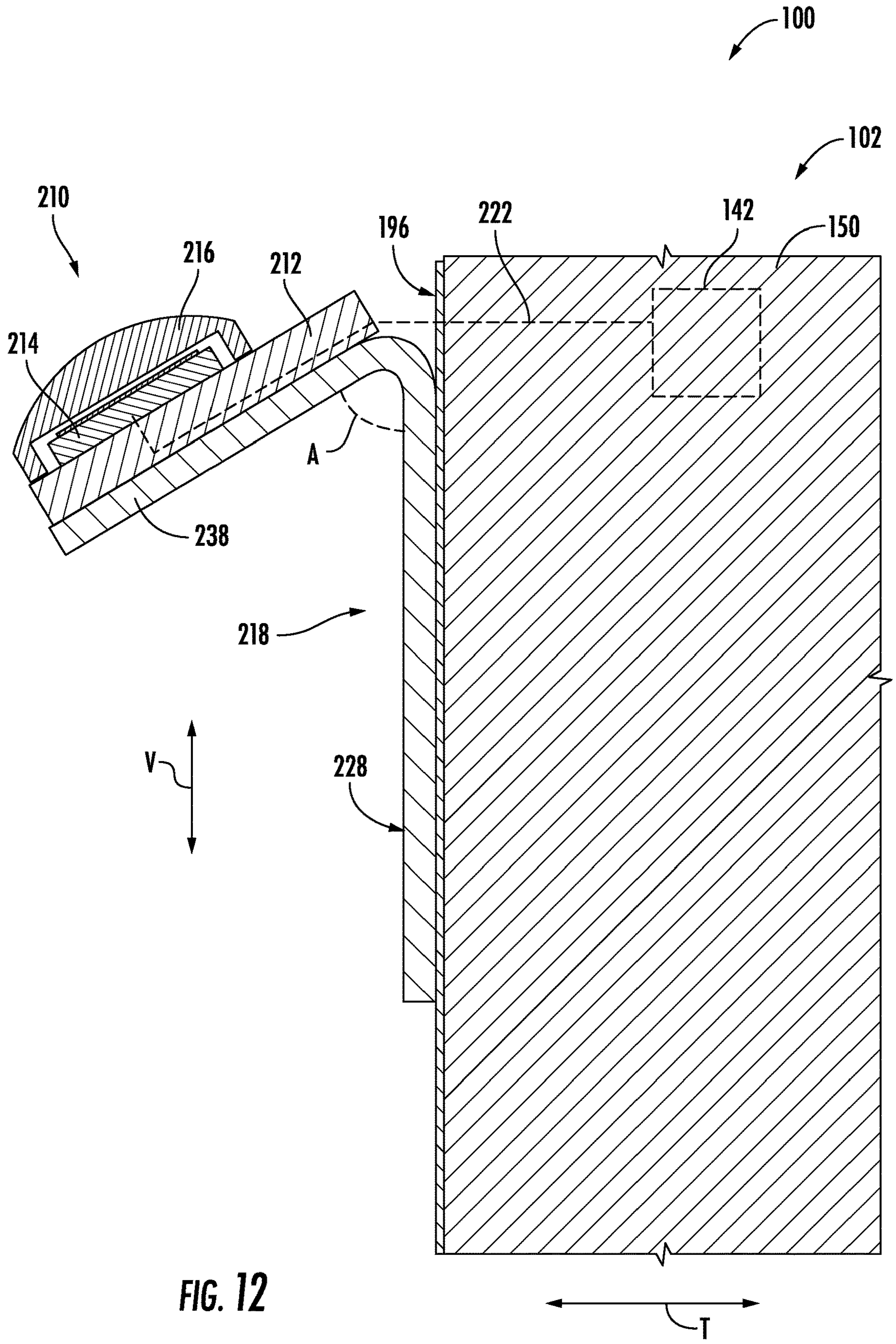
FIG. 12 provides a side view of an embodiment of the system in accordance with an embodiment of the present disclosure.
Figure 13:
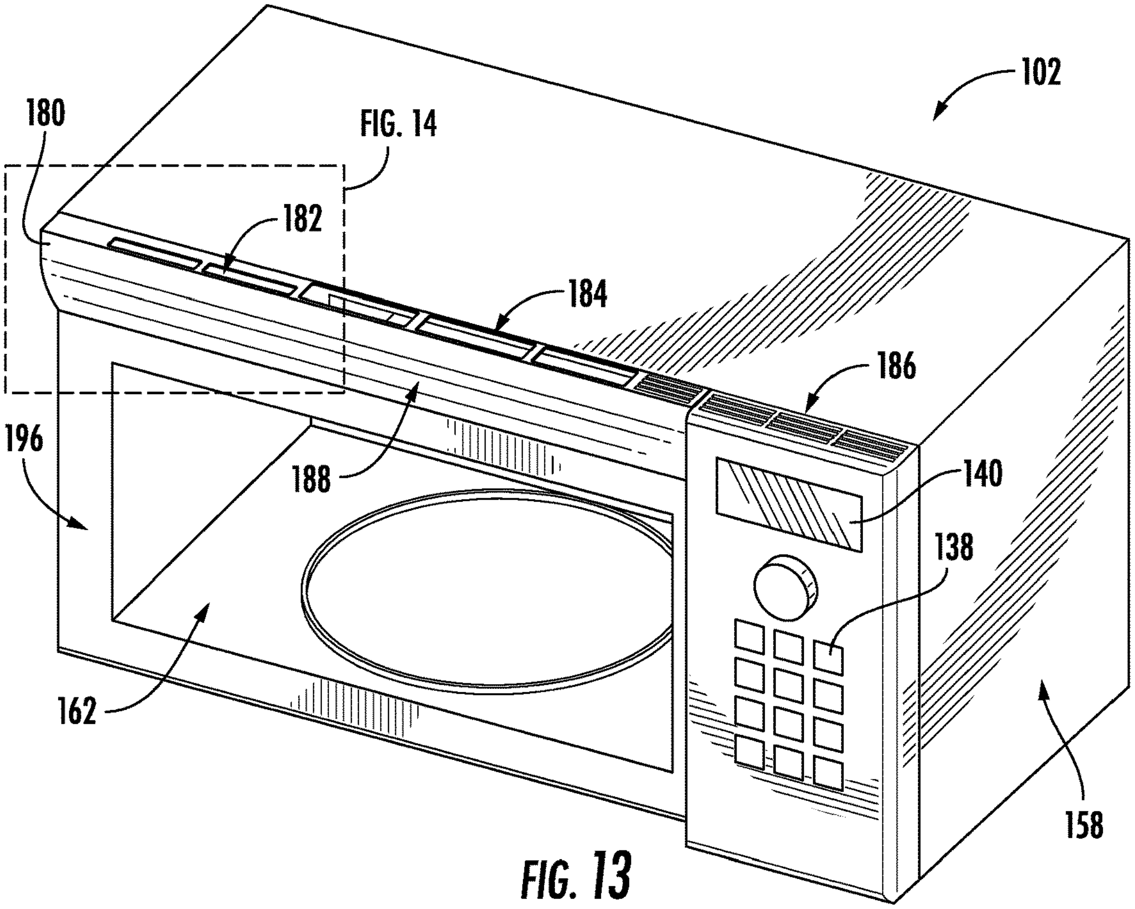
FIG. 13 provides a perspective view of the system in accordance with an embodiment of the present disclosure.
Figure 14:
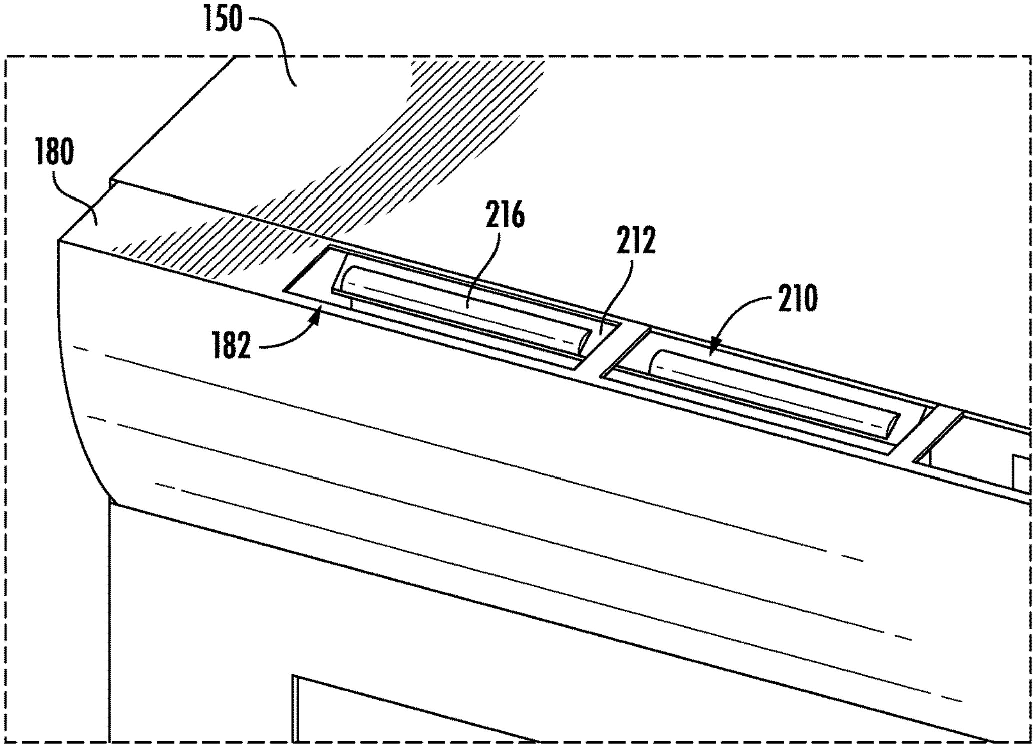
FIG. 14 provides a detailed perspective view of the system of FIG. 13 in accordance with an embodiment of the present disclosure.
Figure 15:
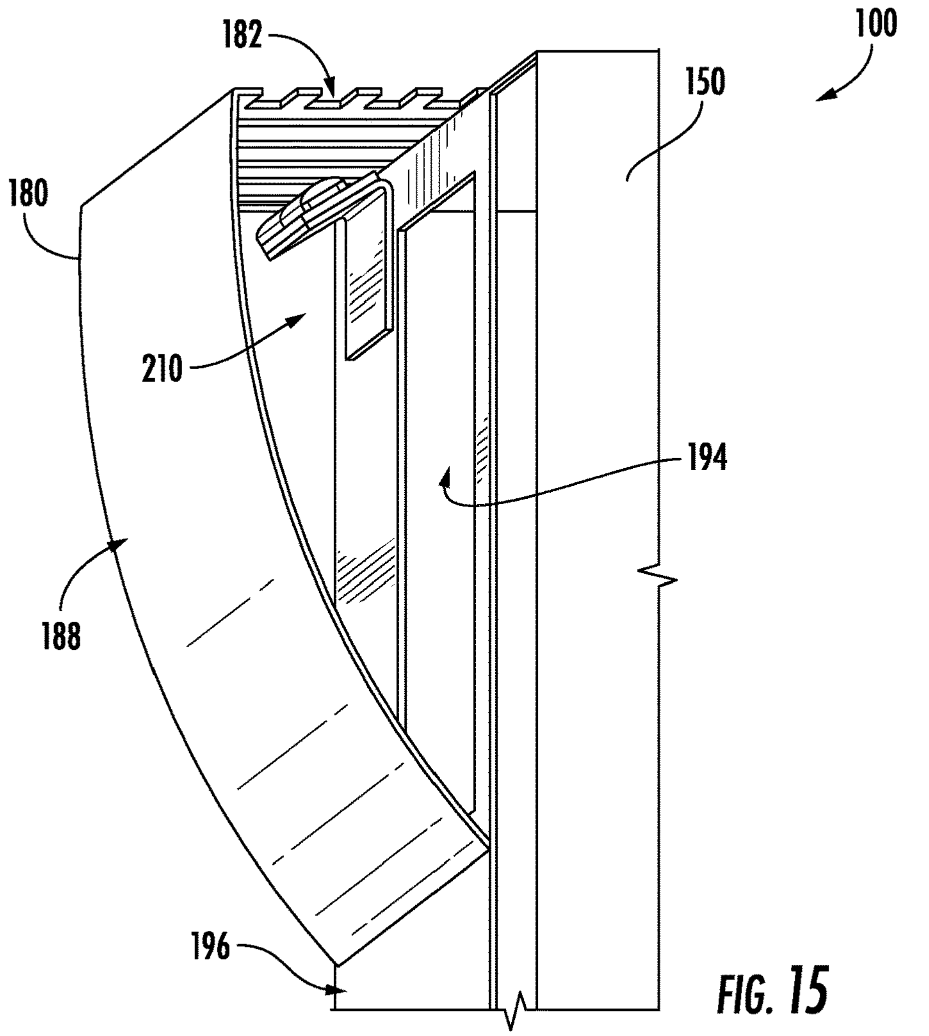
FIG. 15 provides a partially transparent perspective view of a portion of the system in accordance with an embodiment of the present disclosure.
Figure 16:
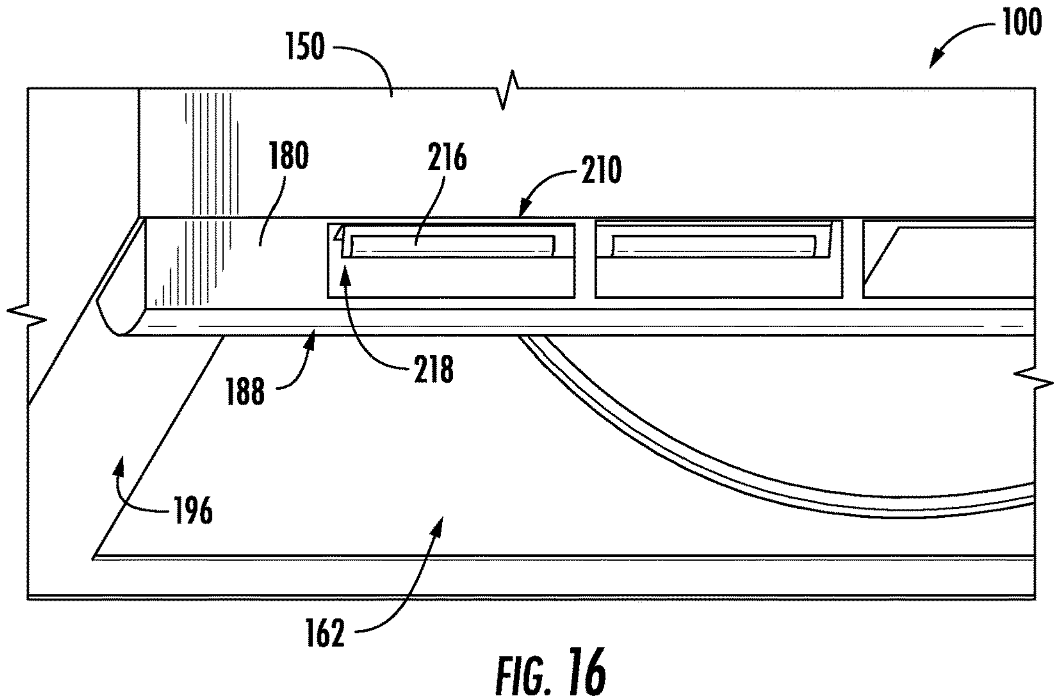
FIG. 16 provides a perspective top-down view of the system of FIG. 15 in accordance with an embodiment of the present disclosure.

Referring to FIGS. 10-11, in various embodiments, the lighting system 210 may be positioned above the first cabinet opening 192 along the vertical axis V. For instance, the lighting system 210 may be positioned along an upper edge, such as at a junction of the front wall 196 to the top end 152. Referring to FIG. 12, the first member 228 may be positioned flush to the front wall 196. The lighting system 210 may particularly allow for light to project and diffuse from an uppermost portion of the cabinet 150. Positioning the lighting system 210 at or above the first cabinet opening 192, such as at a humidity sensor air outlet, or second cabinet opening 194, such as at a vent hood recirculation air outlet, or at a return duct area, may facilitate cooling of the lighting system 210, such as the LEDs.

Referring to FIGS. 13-16, the deflector 180 may include a front face 188 obscuring a view of the lighting system 210 from a front direction (e.g., forward viewed aft). In various embodiments, the front face 188 may be curved or arcuate, such as to extend from the front wall 196 and outward (e.g., forward) along the transverse axis T. The front face 188 extends outward along the transverse axis T such as to extend the first deflector opening 182 along the transverse axis T. The front face 188 may urge or direct air flow through the first cabinet opening 192 along the front face 188, such as to re-direct and promote airflow from being captured within the mount structure 218.

Although depicted with a concave portion of the mount structure 218 positioned downward along the vertical axis V, in various embodiments, the mount structure 218 may be positioned with the concave portion positioned upward. Positioning of the mount structure 218, or the board 212, LED 214, and diffuser 216 attached thereto, may be desirably adjusted based on a user preference for projection of light therefrom.

Embodiments of the system 100 provided herein may desirably increase illumination from the microwave appliance 102, such as toward one or more surfaces at a kitchen or cabinet 160. Embodiments described herein may include the lighting system 210 recessed in a volume between the deflector 180 and the front wall 196 of the cabinet 150 of the microwave appliance 102. Embodiments provided herein may increase illumination without obstructing ventilation openings for the microwave appliance 102.

Embodiments of the system 100 may allow for customized visual outputs from the LED 214 to be emitted based on a user preference. For instance, the lighting system 210 may be set to turn on/off automatically at different times or based on various control signals (e.g., opening the door 166 of the microwave appliance 102, completion of microwave cooking or timer, door ajar, door closed, corresponding to a received audio signal, etc.), as a night light or festive light, or as a communications display projected onto a ceiling, cabinet, or wall. The lighting system 210 may be configured to pulsate, change colors, or display messages or images.

Embodiments of the system 100 may be configured to output or receive control signals, such as to/from a remote device (e.g., a smartphone, tablet, computing device, network computing device, etc.). For instance, a user may adjust one or more visual outputs, such as described above, from a user interface at the remote device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An over the range microwave appliance defining a vertical direction, a lateral direction, and a transverse direction, the over the range microwave appliance comprising:

a cabinet comprising a plurality of walls forming a cooking chamber, wherein a plurality of cabinet openings is formed at a front wall;

a door positioned adjacent to the front wall when in a closed position; and a lighting system positioned at one or more of the plurality of cabinet openings, the lighting system comprising a circuit board at which a light-emitting diode (LED) is operably coupled, the lighting system comprising a diffuser coupled to the circuit board and positioned around the LED, the LED positioned in adjacent arrangement along the circuit board, the circuit board positioned on a mount structure configured to attach to the front wall of the cabinet; and a deflector forming openings corresponding, at least in part, to the plurality of cabinet openings, wherein the lighting system is positioned between the deflector and the front wall of the cabinet, wherein the plurality of cabinet openings comprises a humidity sensor air outlet, a vent hood recirculation air outlet, and a magnetron cooling air inlet, and wherein the lighting system is positioned above the humidity sensor air outlet or the vent hood recirculation air outlet.

2. The over the range microwave appliance of claim 1, wherein the mount structure comprises a first member coupled to a second member, the first member and the second member connected at an end and spaced along an angle between zero degrees and 90 degrees.

3. The over the range microwave appliance of claim 2, wherein the mount structure is coupled to the front wall at the first member, and wherein the circuit board is coupled to the mount structure at the second member.

4. The over the range microwave appliance of claim 2, wherein the mount structure is coupled to the front wall above the cooking chamber.

5. The over the range microwave appliance of claim 1, wherein a concave portion of the mount structure is positioned downward along the vertical direction.

6. The over the range microwave appliance of claim 1, the deflector comprising a front face obscuring a view of the lighting system from a front direction.

7. The over the range microwave appliance of claim 6, wherein the front face of the deflector is curved to extend from the front wall and outward along the transverse direction.

8. The over the range microwave appliance of claim 1, wherein the lighting system is positioned at a junction of the front wall and a top end of the cabinet.

9. The over the range microwave appliance of claim 1, wherein the circuit board and the mount structure is extended along the lateral direction, and wherein the LED is positioned in adjacent arrangement along the lateral direction.

10. A microwave appliance defining a vertical direction, a lateral direction, and a transverse direction, the microwave appliance comprising:

a cabinet comprising a plurality of walls forming a cooking chamber, wherein a plurality of cabinet openings is formed at a front wall;

a door positioned adjacent to the front wall when in a closed position;

a lighting system positioned at one or more of the plurality of cabinet openings, the lighting system comprising a circuit board at which a light-emitting diode (LED) is operably coupled, the lighting system comprising a diffuser coupled to the circuit board and positioned around the LED, the LED positioned in adjacent arrangement along the circuit board along the lateral direction, the circuit board positioned on a mount structure configured to attach to the front wall of the cabinet, wherein the circuit board and the mount structure is extended along the lateral direction; and a deflector forming openings corresponding, at least in part, to the plurality of cabinet openings, wherein the lighting system is positioned between the deflector and the front wall of the cabinet, wherein the plurality of cabinet openings comprises a humidity sensor air outlet, a vent hood recirculation air outlet, and a magnetron cooling air inlet, and wherein the lighting system is positioned above the humidity sensor air outlet or the vent hood recirculation air outlet.

11. The microwave appliance of claim 10, wherein the mount structure comprises a first member coupled to a second member, the first member and the second member connected at an end and spaced along an angle between zero degrees and 90 degrees.

12. The microwave appliance of claim 11, wherein the mount structure is coupled to the front wall at the first member, and wherein the circuit board is coupled to the mount structure at the second member.

13. The microwave appliance of claim 11, wherein the mount structure is coupled to the front wall above the cooking chamber.

14. The microwave appliance of claim 10, wherein a concave portion of the mount structure is positioned downward along the vertical direction.

15. The microwave appliance of claim 10, the deflector comprising a front face obscuring a view of the lighting system from a front direction.

16. The microwave appliance of claim 15, wherein the front face of the deflector is curved to extend from the front wall and outward along the transverse direction.

17. The microwave appliance of claim 10, wherein the lighting system is positioned at a junction of the front wall and a top end of the cabinet.

* * * * *